(12) United States Patent
Tagawa et al.

(10) Patent No.: US 12,427,861 B2
(45) Date of Patent: Sep. 30, 2025

(54) DETECTION METHOD OF LOADING ANOMALY ON VEHICLE, AND DETECTION APPARATUS THEREOF

(71) Applicant: IHI CORPORATION, Tokyo (JP)

(72) Inventors: Satoru Tagawa, Tokyo (JP); Yoshiharu Kaneshima, Tokyo (JP)

(73) Assignee: IHI CORPORATION, Tokyo (JP)

( * ) Notice: Subject to any disclaimer, the term of this patent is extended or adjusted under 35 U.S.C. 154(b) by 145 days.

(21) Appl. No.: 18/383,553

(22) Filed: Oct. 25, 2023

(65) Prior Publication Data

US 2024/0066985 A1    Feb. 29, 2024

Related U.S. Application Data

(63) Continuation of application No. PCT/JP2022/002267, filed on Jan. 21, 2022.

(30) Foreign Application Priority Data

May 14, 2021   (JP) ................................. 2021-082197

(51) Int. Cl.
*B60K 31/12*    (2006.01)
*B60K 31/00*    (2006.01)
*B62D 6/00*    (2006.01)

(52) U.S. Cl.
CPC .......... *B60K 31/12* (2013.01); *B60K 31/0066* (2013.01); *B62D 6/002* (2013.01)

(58) Field of Classification Search
CPC ........... B60W 30/18009; B60W 40/13; B60W 60/001; B60W 2040/1315; B60W 2530/00; B60W 2720/106; B60W 2720/125
See application file for complete search history.

(56) References Cited

U.S. PATENT DOCUMENTS 4,253,541 A *   3/1981   Iida ...................... G05D 1/0265
                                                                              318/587
2010/0198492 A1   8/2010   Watanabe
(Continued)

FOREIGN PATENT DOCUMENTS

EP        2 065 688 A1    6/2009
EP        3 623 216 A1    3/2020
(Continued)

OTHER PUBLICATIONS

Japan Patent Office, "Decision to Grant a Patent," issued in Japanese Patent Application No. 2023-520769, which is a Japanese counterpart of U.S. Appl. No. 18/383,553, mailed on May 7, 2024, 3 pages.

(Continued)

*Primary Examiner* — John Kwon

(57) ABSTRACT

In a detection method of a loading anomaly, relationship between a steering control value of a vehicle and a proper turning radius for the steering control value is constructed as a control map. An actual turning radius of the vehicle is calculated by using a self-location detection function of the vehicle. A difference between the proper turning radius and the actual turning radius is calculated by using the control map. It is determined that a loading anomaly of a cargo loaded on the vehicle has occurred when the difference lies outside a predetermined first reference range.

11 Claims, 3 Drawing Sheets

(56) References Cited

U.S. PATENT DOCUMENTS

| | | |
|---|---|---|
| 2016/0010988 A1 | 1/2016 | Bando et al. |
| 2017/0247054 A1 | 8/2017 | Lee et al. |
| 2018/0194548 A1 | 7/2018 | Helou, Jr. |
| 2020/0319638 A1 | 10/2020 | Bowen |
| 2023/0373468 A1* | 11/2023 | Tagawa ................. B60W 30/04 |
| 2024/0066985 A1* | 2/2024 | Tagawa ................. B60W 50/14 |

FOREIGN PATENT DOCUMENTS

| | | |
|---|---|---|
| JP | H10-100773 A | 4/1998 |
| JP | H10-175476 A | 6/1998 |
| JP | 2012-224270 A | 11/2012 |
| JP | 2013-035399 A | 2/2013 |
| JP | 2015-055603 A | 3/2015 |
| JP | 2017-007444 A | 1/2017 |
| JP | 2020-131865 A | 8/2020 |
| WO | 2008/062867 A1 | 5/2008 |
| WO | 2020/205938 A1 | 10/2020 |

OTHER PUBLICATIONS

European Patent Office, "Extended European Search Report", issued in European Patent Application No. 22807013.2, which is a counterpart to U.S. Appl. No. 18/383,553, on Oct. 31, 2024, 9 pages.
Korean Intellectual Property Office, Official Action, issued in Korean Patent Application No. 10-2023-7038928, which is a counterpart to U.S. Appl. No. 18/383,553, on Jul. 31, 2025, 5 pages.

* cited by examiner

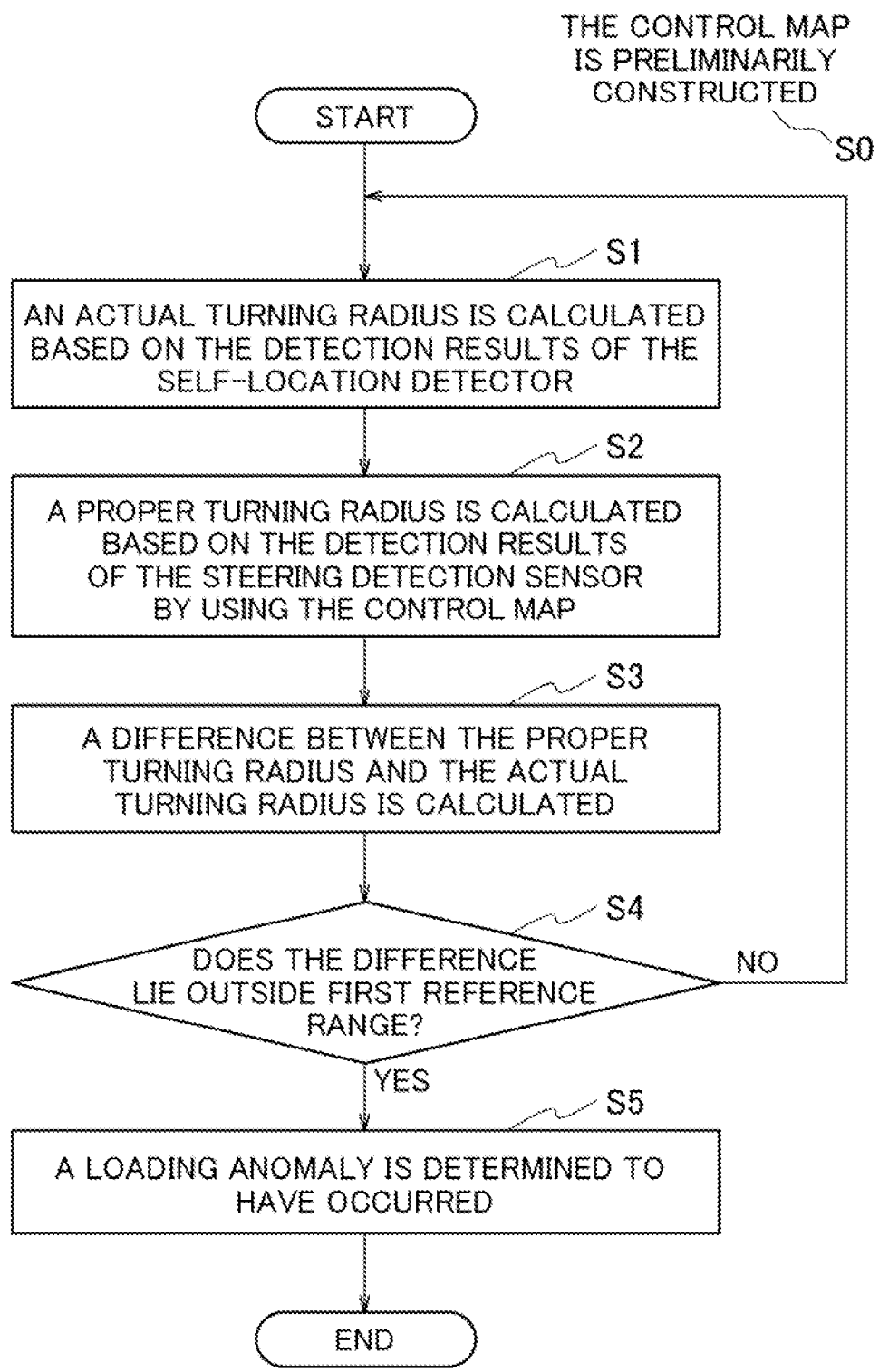

DETECTION METHOD OF LOADING ANOMALY ON VEHICLE, AND DETECTION APPARATUS THEREOF

CROSS-REFERENCE TO RELATED APPLICATIONS

This application is a continuation application of International Application No. PCT/JP2022/002267, filed on Jan. 21, 2022, which claims priority to Japanese Patent Application No. 2021-082197, filed on May 14, 2021, the entire contents of which are incorporated by reference herein.

TECHNICAL FIELD

The present disclosure relates to a detection method of an anomaly of a cargo loaded on a vehicle, and a detection apparatus thereof.

BACKGROUND

Japanese Patent Application Publication No. 2012-224270 (Patent Literature 1) and Japanese Patent Application Publication No. H10-175476 (Patent Literature 2) disclose a detection apparatus of an anomaly of a cargo loaded on a vehicle (e.g., a cargo shift or the like). The apparatus disclosed in the Patent Literature 1 includes an acceleration change detector for detecting an acceleration change occurring at a cargo deck of a vehicle, a cargo shift prediction means, and a preliminarily warning means. The cargo shift prediction means predicts a cargo shift based on the acceleration change detected by the acceleration change detector and a prescribed cargo shift acceleration change judgement condition. If a cargo shift is predicted, the preliminarily warning means outputs a preliminary warning for the cargo shift.

The apparatus disclosed in the Patent Literature 2 calculates an engine drive force, a vehicle acceleration, a trailer mass and a trailer center of gravity position during driving based on various parameters indicating conditions of a vehicle (a tractor and a trailer towed by the tractor). The various parameters indicating conditions are an engine rotational speed, an acceleration pedal opening [or a governor angle], a tractor wheel speed, an air-suspension pressure, a tractor mass, a tractor center of gravity position and so on. Then the calculated trailer center of gravity position is compared with its reference value, and, when the difference between them takes a predetermined value or more, a warning is generated for a potential cargo shift of a cargo on the trailer.

SUMMARY OF THE INVENTION

In the apparatus disclosed in the Patent Literature 1, the acceleration change detector, specifically a three-axis acceleration sensor provided on the trailer, is especially needed in order to detect the anomaly of the loaded cargo. In the apparatus disclosed in the Patent Literature 2, it is needed to detect the various parameters indicating conditions in order to detect the center of gravity position of the trailer on which the cargo is loaded and thereby many sensors are needed.

An object of a detection method and a detection apparatus of a loading anomaly on a vehicle according to the present disclosure is to detect a loading anomaly of a cargo loaded on a vehicle without installing a special sensor.

A detection method of a loading anomaly on a vehicle according to the present disclosure includes: constructing relationship between a steering control value of the vehicle and a proper turning radius for the steering control value as a control map, preliminarily; calculating an actual turning radius of the vehicle by using a self-location detection function of the vehicle; calculating a difference between the proper turning radius and the actual turning radius by using the control map; and determining that a loading anomaly of a cargo loaded on the vehicle has occurred when the difference lies outside a predetermined first reference range.

A detection apparatus of a loading anomaly on a vehicle according to the present disclosure includes: a self-location detector that detects a self-location of the vehicle; a steering detection sensor that detects an actual steering control value of the vehicle; a memory that stores relationship between a steering control value of the vehicle and a proper turning radius for the steering control value as a control map; and a controller that judges a loading anomaly of a cargo loaded on the vehicle. The controller is configured to calculate an actual turning radius of the vehicle based on detection results of the self-location detector, calculate a difference between the proper turning radius and the actual turning radius by using the control map, and determine that the loading anomaly has occurred when the difference lies outside a predetermined first reference range.

By the detection method or apparatus of a loading anomaly on a vehicle according to the present disclosure, it becomes possible to detect an anomaly of a cargo without installing a special sensor.

BRIEF DESCRIPTION OF DRAWINGS

FIG. 3 is a flowchart of a detection method of a loading anomaly on a vehicle according to the embodiment.

DETAILED DESCRIPTION OF THE INVENTION

Hereinafter, an embodiment will be described with reference to the drawings.

Figure 1B:
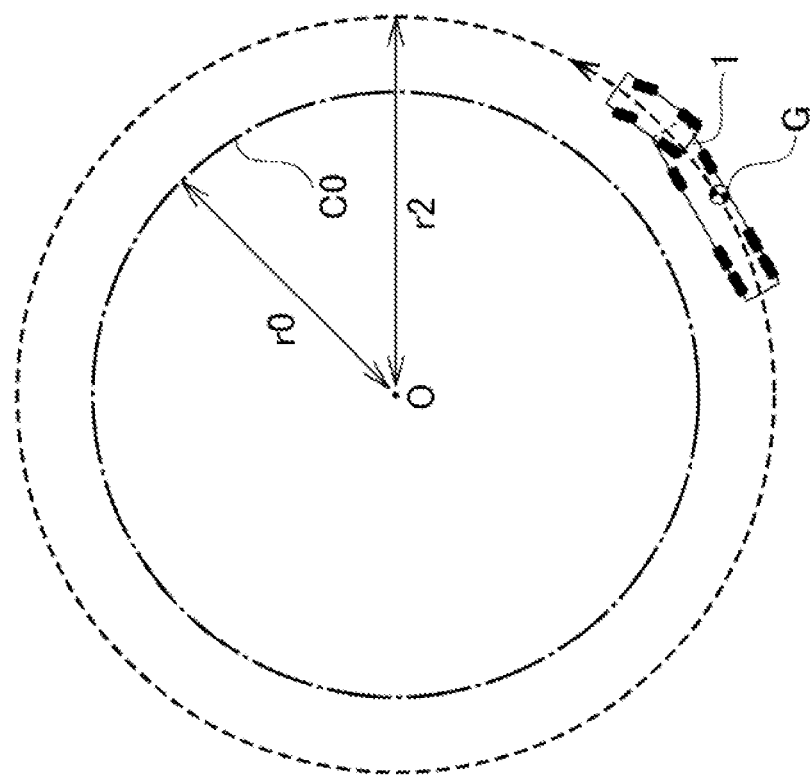
FIG. 1B is a plan view showing relationships between a center of gravity position of a cargo and turning characteristics of a vehicle in a case where the center of gravity position exists on a turning outer side.
Figure 1A:
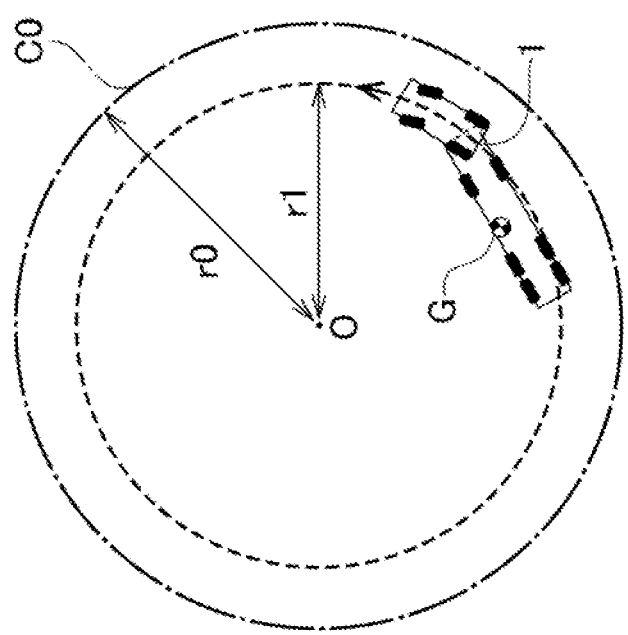
FIG. 1A is a plan view showing relationships between a center of gravity position of a cargo and turning characteristics of a vehicle in a case where the center of gravity position exists on a side of a turning center (turning inner side)

In the present embodiment, an anomaly of a cargo loaded on a vehicle (a cargo shift) is determined from relationship between the center of gravity position of the cargo and turning characteristics of the vehicle. First, the relationship between the center of gravity position of the cargo and the turning characteristics of the vehicle is explained with reference to FIGS. 1A and 1B. Ideally, a center of gravity position G of a cargo on a vehicle 1 should be located on a front-back center line of the vehicle in a plan view. A turning locus C0 for a given steering control value when the center of gravity position G is on the front-back center line is shown in FIGS. 1A and 1B. The turning radius of the turning locus C0 is defined as a proper turning radius r0. That is, when the vehicle 1 is turned by use of the given steering control value while no loading anomaly occurs, the vehicle 1 draws the turning locus C0 (a circle having the proper turning radius r0).

However, as shown in FIG. 1A, if the center of gravity position G of the cargo shifts to a side of the turning center O (the turning inner side), an actual turning radius r1 resulting from the given steering control value becomes smaller than the proper turning radius r0. On the other hand, as shown in FIG. 1B, if the center of gravity position G of the cargo shifts to the turning outer side, an actual turning radius r2 resulting from the given steering control value becomes larger than the proper turning radius r0. In other words, the inventors have newly discovered that a loading anomaly can be detected from turning characteristics. This means that the loading anomaly can be detected from the turning characteristics without calculating nor detecting the center of gravity position.

Figure 2:
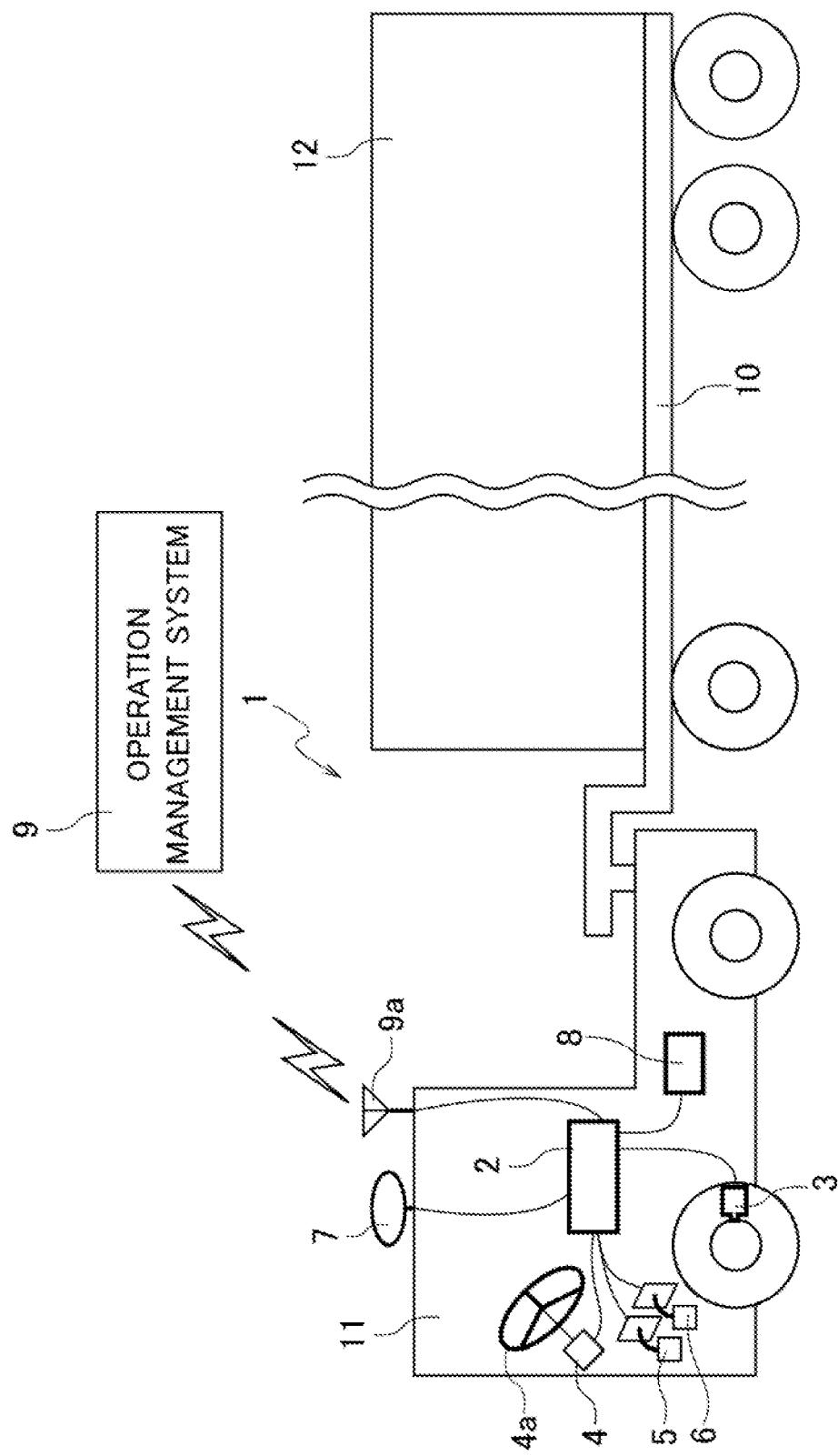
FIG. 2 is a configurational diagram of a vehicle (a tractor and a trailer) on which a detection apparatus of a loading anomaly on a vehicle according to an embodiment is installed.

In the present embodiment, by using the above-mentioned turning characteristics, when a difference between a proper turning radius for a given steering control value and an actual turning radius for the given steering control value falls outside a predetermined first reference range, it is determined that a loading anomaly has occurred. That is, if (an absolute value of) the difference is large, it indicates that the center of gravity position of the cargo is greatly shifted, and therefore, it is determined that a loading anomaly has occurred. Note that, in the present embodiment, as shown in FIG. 2, a case where the vehicle 1 is configured of a trailer 10, on which a cargo 12 is loaded, and a tractor 11, which tows the trailer 10, is described as an example. The tractor is also referred to as a trailer head. Although the connected trailer 10 and tractor 11 as a whole may also be referred to as a trailer, descriptions will be made based on the configuration in which the trailer 10 and tractor 11 in the connected state comprise the vehicle 1.

In addition, in the present embodiment, a case in which the detection of a loading anomaly is done when the above-mentioned vehicle 1 is operated in a business site such as a specific factory will be used as an example. For example, the detection of a loading anomaly is done during in-site running when a large product manufactured at the factory is loaded on the trailer 10 and shipped from the factory (or during in-site running after an arrival at the factory). In the site like this, a running speed of a large vehicle is limited to 5 km/h or less, or 10 km/h or less, etc., so the running speed can be treated as known (or, an influence to a turning radius caused by the running speed can be ignored).

Note that, even also during running on public roads, there is a case where a running route may be predetermined and a running speed may be treated as a known parameter (or its influence can be ignored) when transporting a large loaded cargo at night with traffic control and traffic management. A large loaded cargo includes, for example, a train car, part of an aircraft or a rocket, and part of a bridge. Such a large loaded cargo often tends to become unstable when loaded on a trailer (vehicle), and thereby the detection of a loading anomaly according to the present embodiment is effective. And, even also in such a case where a running route is known and a running speed can be treated as a known parameter (or its influence on turning characteristics can be ignored), the detection of a loading anomaly can be done similarly to the above-mentioned in-site running (which may include running by autonomous driving).

In addition, it is assumed here that the in-site running is done by autonomous driving. Since not only a running speed but also a running route can be specified in the site, it is easier to introduce autonomous driving than on public roads. Furthermore, since it is easier to create a detailed three-dimensional map (or even a two-dimensional map) of a running route in the site, it is easier to introduce autonomous driving. Furthermore, since roads in the site are not public roads and they may be exempt from the Road Traffic Law, it is easier to introduce autonomous driving. The detection method and apparatus of a loading anomaly of the present disclosure are very useful for such an autonomous driving in a site.

FIG. 2 shows a configurational diagram of a detection of a loading anomaly according to the present embodiment. As described above, the vehicle 1 is configured of the tractor 11 and the trailer 10, and the trailer 10 is loaded with a container as the cargo 12. The driving type of the vehicle 1 can take any type, such as an internal combustion engine vehicle (ICV), an electric vehicle (BEV % FCEV), or a hybrid electric vehicle (HEV). Cargos are usually loaded in the container so that the center of gravity of whole of them is on a front-back center line of the vehicle 1. However, if a cargo shift occurs inside the container, the center of gravity of the cargos may shift. The detection apparatus of a loafing anomaly is equipped with sensors that detect various parameters indicating conditions of the vehicle 1 and so on and a controller 2 that controls the detection of a loading anomaly. The controller 2 is a computer and includes a CPU and a memory in which a program for detecting a loading anomaly and so on are stored. The controller 2 may be a controller integrated with other systems installed on the vehicle 1, and the controller 2 of the present embodiment also controls the autonomous driving.

The vehicle 1 includes a speed sensor 3, a steering angle sensor 4, an accelerator pedal stroke sensor 5 and a brake pedal stroke sensor 6 as sensors that detect the various parameters indicating the conditions, and these sensors are connected to the controller 2. Note that these sensors may be connected to the controller 2 via a controller of another system (e.g., engine ECU, ABS/VSC-ECU or the like). That is, the detected values of these sensors may be supplied to the controller 2 via the controller of the other system.

The speed sensor 3 detects an actual running speed of the vehicle 1 (running speed) from rotations of an axle shaft of the tractor 11. The running speed may be obtained based on detection results of a self-location detector described below (in this case, the self-location detector and the controller 2 configure the speed sensor). The steering angle sensor 4 detects a steering angle of the steering wheel 4a (a steering angle request value). In the present embodiment, the steering angle request value (the steering angle) of the steering wheel 4a is treated as the steering angle control value for the steered road wheels in a situation for detecting a loading anomaly. The steering angle sensor 4 is a steering detection sensor that detects a control value relating to the steering control (the steering control value) such as the steering angle request value or the steering angle control value.

For example, when a steer-by-wire system is used for an autonomous driving control or a vehicle stability control (VSC), there may be a case where (the steering angle request value)=(the steering angle control value) is not satisfied. If an autonomous driving system, instead of a driver, controls steering of the vehicle 1, the driver does not operate the steering wheel 4a, so that no steering angle request value exists and the autonomous driving system determines the steering angle control value to steer the steered road wheels. In addition, if the vehicle stability control calculates the steering angle control value by correcting the steering angle request value, (the steering angle request value)=(the steering angle control value) is not satisfied. However, since the steering angle control value can be calculated based on the steering angle request value when the steering angle request value exists, the steering angle control value can be obtained from the steering angle request value.

Note that a complete steer-by-wire system is not adopted in the vehicle 1 of the present embodiment and the steered road wheels are controlled so that the steering angle control value is achieved by using an actuator of the power steering system during the autonomous driving (the steering wheel also turns). Therefore, the steering angle control value can also be directly detected by detecting a state of the actuator. For example, if the actuator is a servo motor, its control state can be detected, so the steering angle control value can also be directly detected.

In addition, a speed-responsive variable gear ratio steering (VGS) system or a four-wheel steering (4WS) system may be adopted to improve vehicle maneuverability at low speeds. The VGS system is a system that increases a ratio of the steering angle control value (the steered angle) of the steered road wheels to the steering angle request value (the steering angle) of the steering wheel, i.e., a gear ratio at low speeds (variably controls the ratio depending on the running speed). The steered road wheels are steered more in relation to the steering angle of the steering wheel at low speeds than at high speeds, and thereby the vehicle maneuverability can be improved. In addition, since rear wheels are steered to an opposite side with respect to the front wheels (steered road wheels) at low speeds in the 4WS system, the vehicle maneuverability can be improved. Unlike passenger cars, a vehicle configured of a tractor and a trailer or a truck often has four or more wheels, but it is called the 4WS system here including such a case.

Since the steering angle control value is calculated based on the steering angle request value when the steering angle request value exists in these cases, the steering angle control value can be obtained from the steering angle request value. In the present embodiment, detection of a loading anomaly is done based on the steering angle request value. Even when these auxiliary systems are integrated into the steering system, the above-mentioned steering detection sensor (the steering angle sensor 4 in the present embodiment) is a sensor that detects a control value relating to the steering control (a steering control value). The steering control value is the steering angle request value or the steering angle control value, or alternatively both of them.

The accelerator pedal stroke sensor 5 is a sensor that detects an operated stroke of the accelerator pedal (a driving force request value). Similar to the steering angle sensor 4 described above, when an accelerator-by-wire system or the VSC system is used, there may be a case where (the driving force request value)=(the driving force control value) is not satisfied. There is a case, when a hybrid system is adopted, where the driving force may be generated by an internal combustion engine and a motor in response to the driving force request value, and the driving force control value may be set separately for each. If an autonomous driving system, instead of a driver, controls driving of the vehicle 1, the driver does not operate the accelerator pedal, so no driving force request value exists and the autonomous driving system determines the driving force control value to drive the vehicle 1. However, similarly here, since the driving force control value is calculated based on the driving force request value when the driving force request value exists, the driving force control value can be obtained from the driving force request value.

The brake pedal stroke sensor 6 is a sensor that detects an operated stroke of the brake pedal (a braking force request value). Similar to the steering angle sensor 4 and the accelerator pedal stroke sensor 5 described above, when a brake-by-wire system, the ABS system or the VSC system is used, there may be a case where (the braking force request value)=(the braking force control value) is not satisfied. In an Electric Vehicle (EV), there is a case, when a hybrid system is adopted, where the braking force may be generated by a braking by a fluid pressure brake (an oil pressure brake or an air brake) and a braking by a regenerative power generation brake with respect to the braking force request value. In such a case, the braking force control value may be set separately for each braking. If an autonomous driving system, instead of a driver, controls driving of the vehicle 1, the driver does not operate the brake pedal. In such a case, no braking force request value exists and the autonomous driving system determines the braking force control value to run the vehicle 1. However, similarly here, since the braking force control value is calculated based on the braking force request value when the braking force request value exists, the braking force control value can be obtained from the braking force request value.

As mentioned above, the autonomous driving system installed in the vehicle 1 is controlled by the controller 2. Therefore, various actuators (not shown in FIG. 2) for automatically controlling the steering of the steered road wheels and the driving/braking of the vehicle 1 can also be controlled by the controller 2. The controller 2 controls these actuators during the autonomous driving. In addition, the autonomous driving system also has a self-location detection function for the vehicle 1 as part of its system. Specifically, the autonomous driving system has the self-location detector that uses a GPS system (a GPS antenna 7) and a gyro sensor (an inertial sensor) 8 together. That is, the GPS system (the GPS antenna 7), the gyro sensor 8 and the controller 2 configure the self-location detector that detects the self-location of the vehicle 1.

Note that the term GPS used here is used as a term that refers to not only the U.S. satellite positioning system but also satellite positioning systems in general. In addition, this also includes systems that use multiple satellite positioning systems simultaneously (e.g., simultaneous use of the U.S. GPS, Russia's GRONASS, and Japan's MICHIBIKI). Furthermore, if no autonomous driving system is installed in the vehicle but such a navigation system is installed, the detection apparatus of a loading anomaly can utilize the self-location detection function of the navigation system.

Furthermore, the autonomous driving system (the controller 2 of the vehicle 1) in the present embodiment includes a communication function (a communication antenna 9a) to communicate with an operation management system 9, and the controller 2 sends and receives various data via wireless communication to and from the operation management system 9. The controller 2 can receive a running route and a control map described below via the operation management system 9 (the communication antenna 9a) and then store them in its internal memory. Note that the operation management system 9 in the present embodiment communicates wirelessly with the vehicle 1, but it may also communicate wired. In the case of wired communication, data are sent and received using a connecting cable before the start of operation, and then the connecting cable is removed. Alternatively, data may also be exchanged via a storage medium or the like without communication.

The above-mentioned devices (sensors) for detecting a loading anomaly (excluding the autonomous driving system and the operation management system 9) in the present embodiment are equipment that the vehicle 1 is normally equipped with, except for the controller 2, and no special sensor for detecting a loading anomaly is installed. In particular, in the present embodiment, functions of the controller for autonomous driving are integrated into the controller 2 for detecting a loading anomaly. That is, the apparatus (method) for detecting a loading anomaly of the present embodiment is operated by utilizing the existing devices installed in the vehicle 1.

The detection method of a loading anomaly by using the detection apparatus of a loading anomaly that has the above-described configuration will be explained with reference to a flowchart shown in FIG. 3. First, the relationship between the steering control value of the vehicle 1 (the steering angle of the steering wheel 4a detected by the steering angle sensor 4, i.e., the steering angle request value) and the proper turning radius for the steering control value is constructed in advance as a control map (step S0). That is, for the vehicle 1 used for the operation (with no loading anomaly), radii of the turning loci that should be drawn by the vehicle 1 as results of operated steering angles (the steering angle request values: the steering control values) of the steering wheel 4a are constructed as the control map. The control map is stored in the memory of the controller 2.

Then, the controller 2 calculates the actual turning radius by using the self-location detection function (detector: the GPS system including the GPS antenna 7, and the gyro sensor 8) during the actual turning of the vehicle 1 (step S1). Firstly in the calculation of the actual turning radius, multiple self-positions during the turning are acquired by the self-location detection function (detector). Subsequently, circle approximation by the least-squares method is done by using the acquired multiple self-positions. The radius of the approximated circle is calculated as the actual turning radius.

Next, the controller 2 calculates a difference between the proper turning radius and the actual turning radius by using the control map (steps S2-S3). More specifically, the proper turning radius that should be drawn by the vehicle 1 with no loading anomaly is firstly acquired from the control map based on the detection results of the steering detection sensor (the steering angle sensor 4) (step S2). Subsequently, the difference is calculated from the actual turning radius calculated in the step S1 and the proper turning radius acquired in the step S2 (step S3).

Subsequently, it is judged whether or not the calculated difference lies outside a first reference range (step S4). When the difference lies outside the first reference range (YES in step S4), the controller 2 determines that a loading anomaly of the cargo loaded on the vehicle 1 has occurred (step S5). On the other hand, when the difference falls within the first reference range (NO in step S4), it is determined that no loading anomaly has occurred, and the process flow returns to the step S1 to continue monitoring of a loading anomaly. When it is determined in the step S5 that the loading anomaly has occurred, a warning sound or a warning display is output to the driver.

The first reference range and the difference are explained by using FIGS. 1A and 1B as an example. First, explained is a case where the actual turning radius is smaller than the proper turning radius r0 as shown in FIG. 1A. Here, it is assumed that the turning radius r1 is a threshold between a loading anomaly and a normal loading (0<r1<r0). If the actual turning radius is even smaller than r1, then it is a loading anomaly. It is recited that r1−r0=α1 (<0). On the other hand, explained is a case where the actual turning radius is larger than the proper turning radius r0 as shown in FIG. 1B. Here, it is assumed that the turning radius r2 is a threshold between a loading anomaly and a normal loading (0<r0<r2). If the actual turning radius is even larger than r2, then it is a loading anomaly. It is recited that r2−r0=β1 (>0).

Here, it is recited that the difference between the actual turning radius and the proper turning radius=(the actual turning radius)−(the proper turning radius) that is calculated by the controller 2 is D. When α1≤D≤β1 is satisfied, the difference D falls within the first reference range (α1 to β1) (NO in step S4). On the other hand, in a case of D≤α1 or β1≤D, the difference D lies outside the first reference range (α1 to β1) (YES in step S4), and then a loading anomaly is determined to have occurred (step S5). Note that |α1|=|β1| may be satisfied or that |α1|≠|β1| may be satisfied. In the present embodiment, with respect to the combination of the vehicle 1 (the trailer 10) and the cargo 12 that are in operation, the first reference range for the proper turning radius is also defined in the control map in addition to the relationship between the steering control value and the proper turning radius described above. In the present embodiment, the control map corresponding to the vehicle 1 (the trailer 10) and the cargo 12 is transmitted from the operation management system 9 to the controller 2 via the communication antenna 9a by wireless communication and then stored in its internal memory.

In addition, in the present embodiment, in the step S4, the controller 2 affirms the step S4 if a state in which the difference lies outside the first reference range continues for a predetermined time (e.g., 1 second). In this way, when an instantaneous change in the actual turning radius occurs due to external disturbances (road surface irregularity, strong wind, etc.), it can be prevented from being determined as a loading anomaly even though it is not actually a loading anomaly. In other words, the accuracy of the detection control of a loading anomaly can be improved.

Furthermore, as described above, if it is determined in the step S5 that a loading anomaly has occurred, the vehicle 1 may be automatically stopped or the vehicle 1 may be controlled in a low-speed running mode, in which an upper speed limit is set, at the same time as the warning output to the driver. Note that the vehicle 1 may be automatically stopped or the vehicle 1 may be controlled in a low-speed running mode without outputting a warning. In this way, the vehicle 1 can be made to run more safely when it is determined that a loading anomaly has occurred.

As mentioned above, since the vehicle 1 can be operated autonomously, the controller 2 can also automatically stop the vehicle 1 or control the vehicle 1 in a low-speed running mode. For example, in case of controlling in the low-speed running mode, in a situation where the vehicle 1 is operated autonomously in a site where the speed is limited to 10 km/h or less as described above, if it is determined that a loading anomaly has occurred, the autonomous driving is shifted to the low-speed running mode where the upper speed limit is further set to a lower speed of 5 km/h.

Alternatively, when it is determined in the step S5 that a loading anomaly has occurred, control may be exercised to compensate for a change in turning characteristics, that is, to eliminate the difference of the turning radii calculated in the steps S1-S3, by using various actuators of the autonomous driving system. For example, the controller 2 firstly compares the self-location detected by the self-location detection function (detector) with the original target location retrieved by the operation management system 9. Then, based on the comparison result, the controller 2 controls the steering system (the steering control) or the ABS system and the VSC system (the driving force control and the braking force control) so that the self-location and the target location match, that is, the difference of the turning radius calculated in the steps S1 to S3 is eliminated. In a case where a loading anomaly is minor and running is not a problem, but the turning characteristics need to be compensated, the vehicle 1 can be turned appropriately by the above control. The above control is especially useful in a case of autonomous driving.

Here, a second reference range that encompasses the first reference range may be further set, and it may be determined that a loading anomaly has occurred and the chassis of the vehicle 1 has abnormality when the calculated difference falls outside the second reference range. The term "chassis" here refers not only to the part of the trailer 10 on which the cargo 12 (the container) is installed, but also to the part (including suspensions and tires) of the vehicle 1 (the trailer 10 and the tractor 11) other than the vehicle body. If the calculated difference becomes very large, i.e., the difference between the actual turning radius and the proper turning radius is very large, it is determined that a chassis abnormality as well as a loading anomaly has occurred. Conversely, if there is no chassis abnormality and no loading anomaly, the difference will not become very large. Chassis abnormalities include low tire pressure, improper suspension geometry, etc. In this way, it is possible to detect not only a loading anomaly but also a chassis abnormality at the same time.

For example, a second reference range ($\alpha 2$ to $\beta 2$) is set that encompasses the first reference range ($\alpha 1$ to $\beta 1$) ($\alpha 2 < \alpha 1$, $\beta 1 < \beta 2$). Then, if ($D < \alpha 1$ or $\beta 1 < D$) and $\alpha 2 \leq D \leq \beta 2$, it is determined that only a loading anomaly has occurred. However, if $D < \alpha 2$ or $\beta 2 < D$, a change in turning characteristics that cannot be caused only by a loading anomaly has occurred, but it is presumed to be caused also by the chassis. Therefore, in such a case, it is determined that an abnormality also has occurred in the chassis in addition to a loading anomaly. Note that $|\alpha 2|=|\beta 2|$ may be satisfied or that $|\alpha 2| \neq |\beta 2|$ may be satisfied. Also here, the detection accuracy can be improved by determining that a loading anomaly and a chassis abnormality are detected if a state in which the difference lies outside the second reference range continues for a predetermined time (e.g., 1 second).

As described above, the various devices (sensors) for detecting a loading anomaly in the present embodiment are equipment that vehicles are normally equipped with and no special sensor for detecting a loading anomaly is installed. Although the present embodiment is equipped with the autonomous driving system and the operation management system 9, these are not essential for detecting a loading anomaly. If the vehicle 1 is equipped with a navigation system, the self-location detection function of the navigation system can be used for detecting a loading anomaly. That is, according to the present embodiment, a loading anomaly of a cargo loaded on a vehicle can be detected without installing a special sensor.

In the above embodiment, the case in which determination of a loading anomaly is done during in-site turning such as a business site is explained as an example, and the running speed is treated as a known parameter (or its influence on turning characteristics can be ignored). However, the apparatus and method of the present disclosure can also be applied when running on public roads where a running speed changes in sequence, and, in such cases, determination of a loading anomaly based on turning characteristics can be done by treating the running speed as a parameter as well. In this case, the proper turning radius may be calculated based on the steering control value and the running speed. In addition, with respect to the first reference range, the first reference range to be applied is determined based on the proper turning radius and the running speed. In such a case, the control map is also constructed in consideration of the running speed.

In addition, the control map is preliminarily constructed in the above embodiment. Here, the control map may be constructed based on data acquired during actual running of the vehicle 1 that is confirmed to have no loading anomaly. That is, the control map may be constructed during actual running of the vehicle 1. As mentioned above, the data for constructing the control map can be acquired by the sensors installed in the vehicle (e.g., the speed sensor 3, the self-location detector, and the steering detection sensor), and no special sensor is needed. Therefore, the control map can be constructed during actual running of the vehicle 1. In this case, a program for building the control map is stored in the memory of the controller 2, and the controller 2 builds the control map using this map building program. In this way, the control map can be constructed efficiently.

In addition, the GPS antenna 7 and the gyro sensor 8 are used as the self-location detector in the above embodiment, but the self-location detector is not limited to this. For example, it is easy to establish roadside-to-vehicle communication by installing markers or communication devices along running road as long as in-site such as business site, and facilities including these devises together with the GPS antenna 7 and the gyro sensor 8 can be adopted as the self-location detector.

In addition, the vehicle 1 in the above embodiment is configured of the trailer 10 with the cargo 12 loaded and the tractor 11 towing this trailer 10. Although the trailer 10 can swing with respect to the tractor 11 in a plan view, the vehicle 1 in which the self-location detector is installed can be a truck in which such swinging cannot occur. Even with trucks, it is possible to detect a loading anomaly using the turning characteristics described above.

What is claimed is:

1. A detection method of a loading anomaly on a vehicle, the method comprising:
   constructing relationship between a steering control value of the vehicle and a proper turning radius for the steering control value as a control map, preliminarily;
   calculating an actual turning radius of the vehicle by using a self-location detection function of the vehicle;
   calculating a difference between the proper turning radius and the actual turning radius by using the control map; and
   determining that a loading anomaly of a cargo loaded on the vehicle has occurred when the difference lies outside a predetermined first reference range,
   wherein a second reference range that encompasses the first reference range is set; and
   wherein the loading anomaly is determined to have occurred and a chassis abnormality is also determined to have occurred when the difference lies outside the second reference range.

2. The detection method of a loading anomaly on a vehicle according to claim 1,
   wherein the loading anomaly is determined to have occurred when a state in which the difference lies outside the first reference range continues for a predetermined time.

3. The detection method of a loading anomaly on a vehicle according to claim 1, further comprising:
   controlling the vehicle, when the loading anomaly is determined to have occurred, so as to (1) stop the vehicle automatically, (2) control the vehicle in a low-speed mode where an upper speed limit is set, or (3) control the vehicle to eliminate the difference between the proper turning radius and the actual turning radius.

4. The detection method of a loading anomaly on a vehicle according to claim 1,
wherein the control map is constructed while treating a running speed of the vehicle as a parameter, and
wherein the difference is calculated by using also the running speed of the vehicle that is detected.

5. The detection method of a loading anomaly on a vehicle according to claim 1,
wherein the control map is constructed during actual running of the vehicle.

6. A detection apparatus of a loading anomaly on a vehicle, the apparatus comprising:
a self-location detector that detects a self-location of the vehicle;
a steering detection sensor that detects an actual steering control value of the vehicle;
a memory that stores relationship between a steering control value of the vehicle and a proper turning radius for the steering control value as a control map; and
a controller that judges a loading anomaly of a cargo loaded on the vehicle,
wherein the controller is configured to
calculate an actual turning radius of the vehicle based on detection results of the self-location detector,
calculate a difference between the proper turning radius and the actual turning radius by using the control map, and
determine that the loading anomaly has occurred when the difference lies outside a predetermined first reference range, and
wherein the controller is further configured to determine that the loading anomaly has occurred and a chassis abnormality also has occurred when the difference lies outside a second reference range that encompasses the first reference range.

7. The detection apparatus of a loading anomaly on a vehicle according to claim 6,
wherein the controller is configured to determine that the loading anomaly has occurred when a state in which the difference lies outside the first reference range continues for a predetermined time.

8. The detection apparatus of a loading anomaly on a vehicle according to claim 6,
wherein the controller is further configured to control the vehicle, when the loading anomaly is determined to have occurred, so as to (1) stop the vehicle automatically, (2) control the vehicle in a low-speed mode where an upper speed limit is set, or (3) control the vehicle to eliminate the difference between the proper turning radius and the actual turning radius.

9. The detection apparatus of a loading anomaly on a vehicle according to claim 6, further comprising:
a speed sensor that detects a running speed of the vehicle,
wherein the control map is constructed while treating a running speed of the vehicle as a parameter and then stored in the memory, and
wherein the controller is configured to calculate the difference by using also the running speed detected by the speed sensor.

10. The detection apparatus of a loading anomaly on a vehicle according to claim 6,
wherein the controller constructs the control map by using detection results of the self-location detector and the steering detection sensor during actual running of the vehicle.

11. The detection apparatus of a loading anomaly on a vehicle according to claim 10,
wherein the controller constructs the control map by using detection results of the speed sensor, the self-location detector and the steering detection sensor during actual running of the vehicle.

* * * * *